United States Patent [19]

Norrie et al.

[11] Patent Number: 4,540,094
[45] Date of Patent: Sep. 10, 1985

[54] PRODUCT HANGER

[75] Inventors: Lyle W. Norrie, Etobicoke; Richard I. Pawlicki, Scarborough, both of Canada

[73] Assignee: Knud Simonsen Industries Ltd., Rexdale, Canada

[21] Appl. No.: 421,154

[22] Filed: Sep. 22, 1982

[51] Int. Cl.³ .............................................. A47F 5/08
[52] U.S. Cl. .................................... 211/113; 211/46; 211/119; 211/162; 17/44.4; 312/184
[58] Field of Search ................ 211/113, 46, 119, 118, 211/162; 17/44.4; 312/184, 321

[56] References Cited

U.S. PATENT DOCUMENTS 2,611,492  9/1952  Watts.
3,594,858  7/1971  Simonsen.
3,792,508  2/1974  Simonsen et al..
3,982,300  9/1976  Selkie et al. ........................... 17/44.4

FOREIGN PATENT DOCUMENTS 132649  8/1951  Sweden.

Primary Examiner—Ramon S. Britts
Assistant Examiner—Blair M. Johnson
Attorney, Agent, or Firm—George A. Rolston

[57] ABSTRACT

Support apparatus for supporting products on a processing line of the type wherein a plurality of support bars are supported transversely of such line, and comprising hanger means shaped and adapted for supporting products therefrom, attachment means at either end of said hanger means, for attachment to a respective said support bar, connecting means at each end of each said support bar for interengagement with said attachment means on said hanger means, and wherein such attachment means and connection means are interengageable with each other from either end of such support bar whereby said hanger means may be attached to said respective support bar.

9 Claims, 7 Drawing Figures

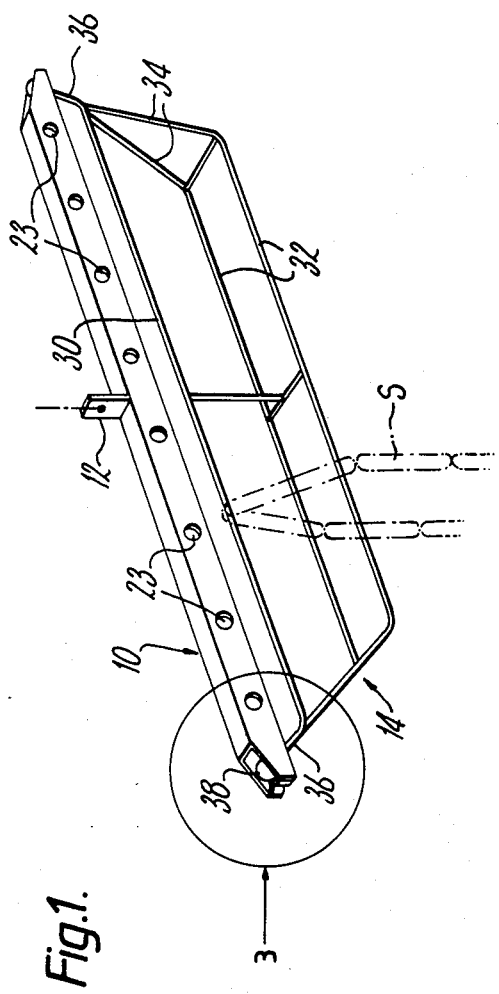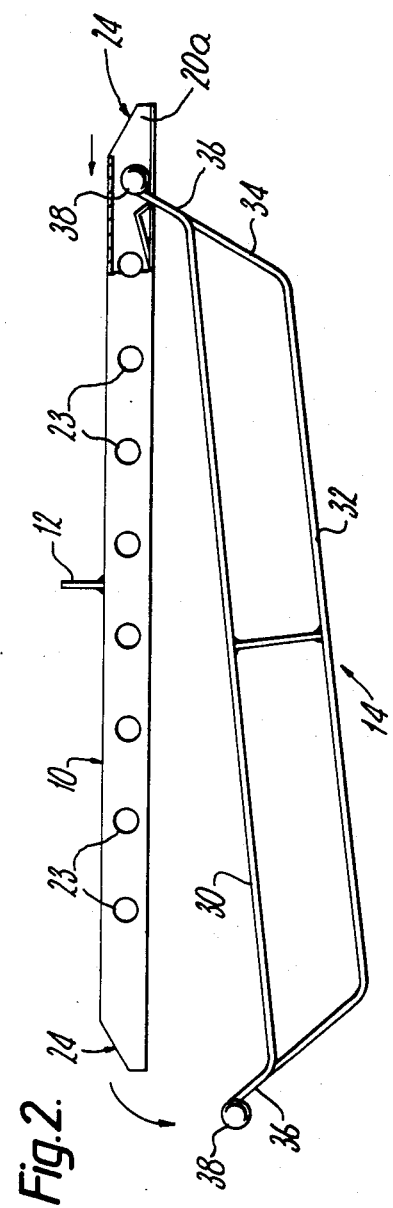

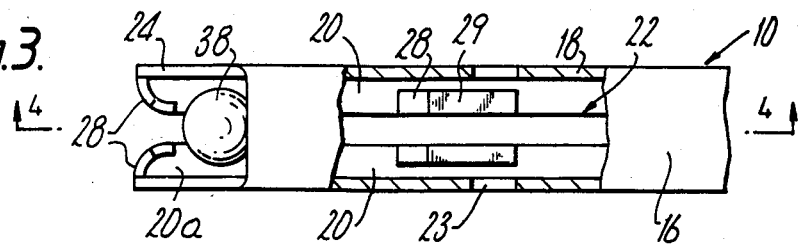
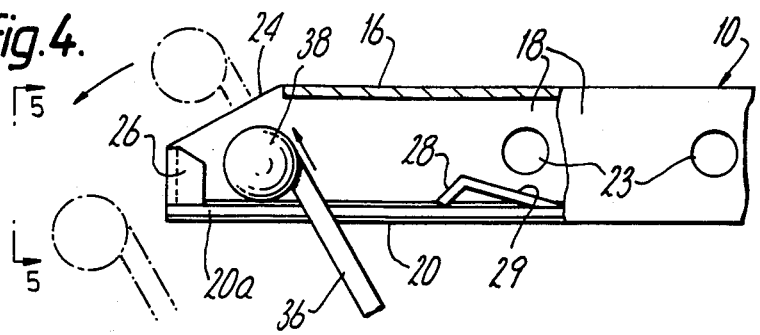
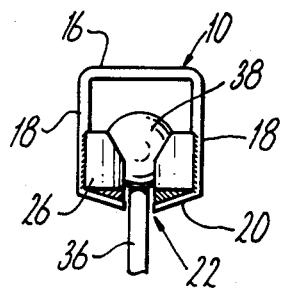
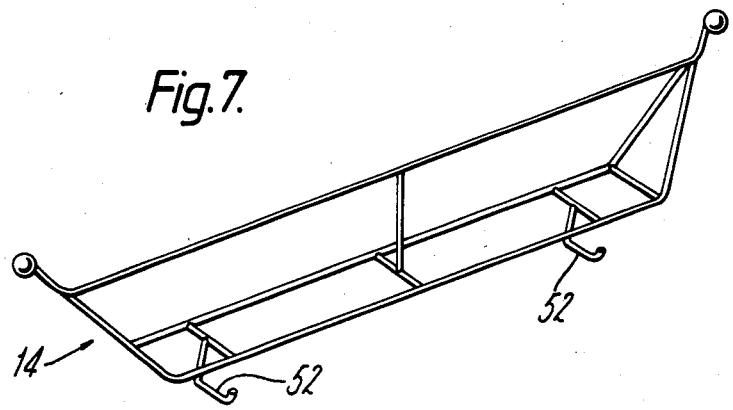

U.S. Patent Sep. 10, 1985 Sheet 3 of 3 4,540,094
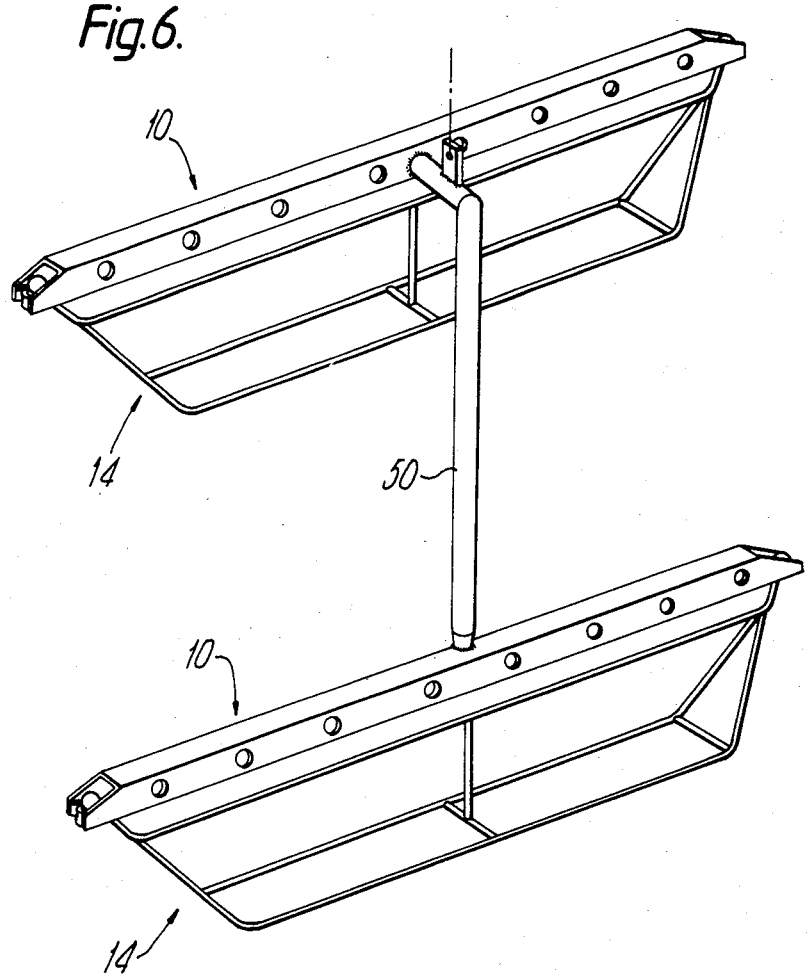

PRODUCT HANGER

The invention relates to a hanger for supporting products, such as meat products, for movement of such products along a processing line.

BACKGROUND OF THE INVENTION

Processing of products, such as for example meat products, along a processing line requires some form of means for suspending the products or articles, typically from an overhead single rail conveyor system. Hangers suitable for supporting meat products are shown in U.S. Pat. Nos. 3,594,858, 3,792,508 and 3,982,300. In the case of this type of hanger, the hanger must be completely detachable from the conveyor system so that it can be loaded with products by hand. It is then lifted up into the conveyor system and placed in position on a transverse support bar. The products, such as meat products, are carried on the hangers along the conveyor rail, through various different processing stations. In a typical processing line for meat products this may involve cooking, washing, smoking, chilling and the like. The products are then unloaded from their hangers, and the hangers must then be passed through a washing chamber before they are reloaded.

A typical such processing line will thus have an endless conveyor, with the hangers simply being carried from the loading to the unloading station, and back to the loading station again in a continuous loop. A typical processing line will thus have corners at various places, depending upon the layout of the line, and the space available if it is being installed in an existing building, and the like. It has been found that in some cases the support bars and hangers, as they are carried around such corners, can become entangled, which then disrupts the processing line and may result in loss of finished product.

Another factor which must be considered is the type of manual work involved in loading the products onto the hangers and then attaching the hangers on their respective support bars. In order to facilitate this work, there is shown in U.S. Pat. No. 3,982,300 a support bar having a slide rail along which one end of the loaded hanger may be slid. The slide rail thus carries the weight of the load on the hanger, as the hanger is being introduced into the processing line. This improvement greatly facilitated the manual work involved, and was found to produce a significant speed up in operation.

It will however be noted that the slide rail system disclosed in such patent, must be designed for loading either from the right hand side or from the left hand side, but will not be equally adaptable to both sides. Thus for example if an owner of such a processing line wishes to load from both sides, or for example from either side alternately, it is not possible to use the slide rail system referred to.

Clearly, it is desireable to provide such a supporting system which as far as possible eliminates problems of entanglement between one such hanger and another in use, and which is also fully flexible so as to be capable of being loaded from one side or the other.

BRIEF SUMMARY OF THE INVENTION

With a view to overcoming the foregoing problems the invention comprises support apparatus for supporting products on a processing line of the type wherein a plurality of support bars are supported transversely of such line, and comprising hanger means shaped and adapted for supporting products therefrom, attachment means at either end of said hanger means, for attachment to a respective said support bar, connecting means at each end of each said support bar for interengagement with said attachment means on said hanger means, and wherein the improvement comprises that such attachment means and connection means are interengageable with each other from either end of such support bar, whereby said hanger means may be attached to said respective support bar, including guide means on said support bar for receiving and guiding the attachment means of one end of said hanger means, while the same is moved from one end to the other of said support bar.

In the preferred embodiment of the invention, the attachment means on the hanger means will be identical at each end, and the connection means on the support bar will likewise be identical. However, it is not an absolute requirement that such attachment means and connection means shall be identical at either end. Certain of the advantages of the invention can be obtained where the shaping of the attachment means at one end is different from that of the other end, and where the connection means are different from one end to the other. The only requirement is that the guide means on the support bar for receiving the attachment means, and guiding them from one end to the other of the support bars will be capable of receiving the attachment means when interengaged at either end of such support bars.

The invention further comprises the provision of a support bar having guide means consisting of essentially parallel spaced apart flanges or rails, and wherein the attachment means comprises an enlargement or protusion at either end of the hanger means, and being mounted on respective reduced diameter necks at each such end, so that the reduced diameter necks may fit between the flange means with the enlargement or protrusion riding on such flange means, and carrying the weight of the loaded hanger.

The invention further comprises that such a support bar shall be formed in the shape of an essentially elongated tubular structure, having opening means at either end for introduction of the enlargement or protrusion at either end, and having a slotted opening formed along its underside along its length whereby the reduced neck portions may extend therethrough, permitting the hangers to be hung beneath the support bars.

The invention further comprises the provision of stop means in such a support bar, for retaining said attachment means therein against inadvertent removal.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 1 is a perspective illustration showing a portion of a typical processing line, with the supporting apparatus according to the invention shown thereon;

FIG. 2 is an enlarged elevational view of the support bar and hanger according to the invention shown in isolation;

FIG. 3 is an enlarged perspective detail of the portion of FIG. 2 identified in the circle 3 in FIG. 2;

FIG. 4 is a schematic view showing the movement of the hanger relative to the support bar during loading;

FIG. 5 is a view similar to FIG. 4, showing the movement during loading from the opposite side;

FIG. 6 is a schematic illustration showing an alternate embodiment of the invention, and, FIG. 7 is a schematic illustration of a still further embodiment.

As best shown in FIGS. 1 to 3, the invention as illustrated is typically used on a processing line, such as a meat processing line, for processing a variety of different meat products, typically sausage products or for example cuts of meat, or packaged meat which may require to be processed in some way such as by cooking, washing, smoking, chilling or the like. For this purpose it will be passed sequentially through a series of chambers, or what is essentially a single elongated tunnel, in which the various processing operations are carried out at different stations along such an elongated tunnel. The details of such a processing line and such tunnel or housing are omitted for the sake of clarity, and are in any event well known to persons skilled in the art.

Along such a processing line, products are carried on a single overhead conveyor rail (not shown). A plurality of carrier members or so-called trollies (not shown) are arranged along such rail, and are typically connected together by any suitable means such as a continuous link chain. Any suitable power operated means (not shown) are provided for moving the chain and thus drawing the trollies along the rail.

Attached to each of the trollies is a transverse generally horizontal support bar 10, which is supported from or attached by means of a generally vertical tongue 12, from its respective trolley T.

In accordance with this embodiment of the invention, the support bar 10 supports a product hanger indicated as 14, from which products typically such as the sausage products S shown in phantom, may be suspended.

It will of course be appreciated that the invention is not to be regarded as limited solely to the processing of meat products or to the processing of sausages, but is of application to any such a use where products are required to be supported by some form of transverse supporting means.

As best shown in FIGS. 2 and 3, the support bar in this embodiment of the invention will be seen to comprise a generally elongated tube structure of any suitable cross-section. In this case a generally rectangular cross-section is shown which is readily manufactured on a conventional brake press. Other cross-sections may be suitable in other cases. The rectangular cross-section shown comprises a top wall 16, side walls 18, and lower inturned flanges 20-20 which together define an elongated slot 22. Openings 23 are formed at intervals to facilitate cleaning, and to save weight.

Either end of such tubular structure is open as at 24—24. Preferably such openings are oriented in an upwardly angled convergent manner as illustrated, whereby to define end flange portions 20a which extend at either end beyond the limits of the top wall 16.

Stop members 26, formed on side walls 18, are turned inwardly to form outer abutments for reasons to be described below.

Inner abutment means 28 having ramp portions 29 are located within the tubular structure, spaced inwardly from either of the open ends, by a predetermined distance. In this embodiment, such inner abutments are formed and attached on the upwardly directed surfaces of the flanges, but other forms of such abutment means would function.

Thus indentations, or recesses, or depressions could be formed in such flanges or conceivably in the walls, to provide some form of stop means.

The hanger 14 will be seen to comprise an upper strut portion 30, and two spaced apart lower strut portions 32—32, forming in section, the corners of an equilateral triangle. Preferably, the spacing between the upper strut 30 and each of the lower struts 32 is approximately equal to the length of the standard size product, such as a standard size sausage product which may be located thereon, so that the struts 30 and 32 will in fact lie against the links between the sausages. However, it will of course be understood that sausages may be made in a variety of different lengths, and in fact no great problem is caused by having the spacing of the struts 30 and 32 somewhat different than the lengths of such sausages. Struts 32 are formed with upwardly angled junction pieces 34 at either end, which are attached to opposite ends of the upper struts 30, typically by welding or the like.

Extension neck portions 36 are connected to either end of the upper strut 30, typically being simply upwardly bent portions thereof formed integrally therewith. Attachment means in the form of enlarged bulbous protrusions 38 are formed on the ends of neck portion 36, for interengagement with the support bar in a manner to be described below.

In this embodiment, such abutment means are in the form of spherical balls, of identical size and shape. Preferably, such balls are fastened to the neck portions 36 in an offset manner so that the upper surface of the neck, if extended along an axis, would be essentially tangential to the upper surface of the ball (see FIG. 3).

The spacing between the two attachment means at opposite ends of the hanger will be such that they can be positioned in the opposite ends of the support, but will be of sufficient length that when one of the attachment means or balls is resting against the inward side of the interior abutment within one end of the support bar 10, the ball at the other end of the hanger 14 will be outside of the support bar. In this way, as best shown in FIG. 4, the hanger 14 may be attached to the support bar 10 by first of all introducing the attachment means or ball at one end of the hanger 14 into the open end of the support bar 10 nearest to the operator. The ball is then slid the entire length of the interior of the support bar, and as it slides, it will ride up and over the two inner abutment means 28. The ball or attachment means 36 at the other end of the hanger is then introduced into the end of the support bar nearest to the operator, and raised to clear the outer abutment 26, and moved in an inch or so and then allowed to come to rest.

Removal of the hanger from the support bar can also be achieved manually if desired, simply by reversing these operations.

In practice, however, some form of automatic or self-removing device will be provided. This may take the form of for example a control bar (not shown), which will engage the hanger, as it reaches a certain predetermined point on the conveyor system. In effect, this will essentially push or nudge the hanger sideways relative to the support bar, causing the ball at one end of the hanger to ride upwardly over outer abutment 26 and out of the open end of such support bar and drop downwardly.

When this occurs, the hanger will still be suspended by the ball at its opposite end, which will still lie between the inner and outer abutments at the end of the support bar, and will thus be prevented from sliding the length of the support bar.

Clearly, the function of the control will also achieve unloading of meat products on the hanger for packaging or further processing.

It will of course be appreciated that various modifications could be made without departing from the spirit of the invention. Thus while the illustrations show attachment means in the form of spherical balls at each end of the hanger, which are in fact of identical shape, this is not a fundamental feature. It does however lead to obvious advantages in that the hangers can be used either way around.

It is apparent however that the hangers could be provided with attachment means at either end which do exhibit certain differences, while such modified device would still be capable of achieving numerous advantages of the invention.

In particular, the use of such attachment means generally avoids the use of hook portions, or protruding prongs, which were used in the earlier forms of hanger, and which in some cases had a tendency to become tangled up during handling or use. In addition, the principle advantage which is readily evident is the fact that by the use of the invention, the hanger may be attached to and removed from the support bar from either side of the conveyor system. This of course greatly increases the adaptability of the conveyor system to a variety of different processing methods and requirements, and at the same time facilitates the manufacture of such hangers and support bars on a larger scale, with consequent savings in cost.

Other modifications which may be made for example are shown in FIGS. 6 and 7. In FIG. 6, two or more such support bars can be mounted on a common vertical support shaft or column, indicated as 50, which may be suspended from the conveyor system. Preferably, the two or more support bars will be spaced apart either vertically, or both vertically and in spaced apart horizontal planes, so as to ensure that the product, particularly in the case of meat products, being supported on the separate hangers will be maintained out of contact with one another while they pass through the processing zones.

Another modification which may be used is the addition of some further form of attachment means, such as the suspension loops 52, on the hangers, which will permit the attachment of the conventional generally triangular shaped smoke house stick, which was used in the past for suspending other types of products. This additional feature in some cases is an advantage, where it is desired to use the processing line for processing a still greater variety of different meat products from time to time.

What is claimed is:

1. A support assembly for supporting products on a processing line transversely of said line each said support assembly comprising:
    a support bar having a continuous hollow tubular interior along its length and having two ends;
    a continuous slot along said support bar of predetermined width;
    an opening at each end of said support bar, communicating with said slot, said opening having a dimension greater than the predetermined width of said continuous slot;
    hanger means shaped and adapted for supporting products therefrom and having two ends, and an intermediate hanger portion, and,
    attachment means at both ends of said hanger means for attachment to said support bar said hanger means having a portion thereof adapted to be inserted through a said opening, into the interior of said support bar, and engaging the interior of said support bar adjacent said slot.

2. A support assembly as claimed in claim 1 including stop means adjacent to the ends of said support bar for interengagement with said attachment means.

3. A support assembly as claimed in claim 1 including ramp means associated with said stop means to permit said attachment means to ride over said stop means upon movement in one direction.

4. A support assembly as claimed in claim 1 including abutment means adjacent said openings at said ends of said support bar for engaging said attachment means.

5. A support assembly as claimed in claim 1 wherein such attachment means comprises stem members at both ends of said hanger means, and knob members on said stem members.

6. A support assembly as claimed in claim 14 wherein said attachment means is slidable along the interior of said tubular support bar from one and thereof to the other end thereof.

7. A support assembly as claimed in claim 6 wherein said support bar defines support flanges along both sides of said slot, for supporting said attachment means.

8. A support assembly as claimed in claim 7 including knob members forming part of said attachment means and adapted to ride on said support flanges.

9. A support assembly as claimed in claim 8 including locating means within said tubular support bar and engageable with said knob members to establish a predetermined positional relationship.

* * * * *